United States Patent [19]

Arai et al.

[11] Patent Number: 4,974,827
[45] Date of Patent: Dec. 4, 1990

[54] DOCUMENT CONVEYANCE APPARATUS

[75] Inventors: Hiroyuki Arai; Tsugio Hirabayashi, both of Hachioji, Japan

[73] Assignee: Konica Corporation, Tokyo, Japan

[21] Appl. No.: 367,768

[22] Filed: Jun. 16, 1989

[30] Foreign Application Priority Data

Jun. 29, 1988 [JP] Japan .................. 63-163198

[51] Int. Cl.$^5$ .............................. B65H 7/14
[52] U.S. Cl. ....................... 271/265; 271/186; 271/291; 271/902
[58] Field of Search ............... 271/291, 186, 902, 265

[56] References Cited

U.S. PATENT DOCUMENTS

| 4,761,001 | 8/1988 | Hayakawa | 271/186 X |
| 4,881,729 | 11/1989 | Culligan | 271/291 X |
| 4,884,794 | 12/1989 | Dinatale | 271/291 X |

FOREIGN PATENT DOCUMENTS

| 53-112738 | 10/1978 | Japan . | |
| 59-4548 | 1/1984 | Japan . | |
| 59-216159 | 12/1984 | Japan . | |
| 60-8834 | 1/1985 | Japan . | |
| 74851 | 4/1987 | Japan | 271/186 |
| 1-197246 | 8/1989 | Japan . | |

Primary Examiner—Richard A. Schacher
Attorney, Agent, or Firm—Frishauf, Holtz, Goodman & Woodward

[57] ABSTRACT

An automatic document conveyer for respectively conveying documents to a position for copying by a copy machine. The document conveyer has a document holder where the documents are set to be conveyed a first document conveyer which conveys the bottom document into a second document conveyer. The second document conveyer has pressure rollers which provides a flat area along with a conveyance belt to hold the conveyed document at a predetermined position beyond the first pressure roller of the pressure rollers so that the conveyed document of a different size is under the pressure of the second conveyer. The document conveyer also has a document turn-over mechanism to which the conveyed document is conveyed by the second document conveyer in the reversible direction in order to be turned over without a copying process, and the conveyed document is turned back to the predetermined position and further to the position for copying.

18 Claims, 13 Drawing Sheets

DOCUMENT CONVEYANCE APPARATUS

BACKGROUND OF THE INVENTION

This invention relates to an automatic document feeder with a document reversing function which is mounted on an electrophotographic copier, wherein a two sides document is conveyed in both ordinary and reverse directions on the platen glass to be exposed on both sided of the document. Automatic document feeders (ADF) have previously been provided for electrophotographic copiers and image reading apparatus in order to supply documents to them effectively and automatically, but conventional automatic document feeders have a limited function in that they are used mainly for copiers which can copy only one sided documents.

Recently there are great necessities for a copier which can copy two sided documents onto one side or both sides of a recording paper, and for an image reading apparatus to read and record both sides of the document. As a result, a lot of reversible automatic document feeders (RADF) which are equipped with a document reversing mechanism, have been proposed. Those are disclosed in Japanese Patent Publication Open to Public Inspection No. 216159/1984, Japanese Patent Publication Open to Public No. 112738/1978, Japanese Patent (Utility Model) Open to Public Inspection No. 4548/1984, and Japanese Patent Publication Open to Public Inspection No. 8834/1985.

A circulation type document feeder (RDH) has also been proposed. It is a document feeder in which a document sheet is separated from a pile of document sheets on a document stacker, fed automatically onto a platen glass sheet by sheet, exposed on the platen glass, and returned to the document stacker to be processed repeatedly. This circulation type document feeder (RDH) can make one copy at each circulation, so a document sheet is circulated in the document feeder as many times as the necessary number of copies.

A circulation type document feeder in which a mechanism is installed to turn over documents, was proposed by the inventors of the present invention recently. It is disclosed in Japanese Patent Application No. 20228/1988. This document feeder makes the following possible. Copying can be conducted continuously and rapidly, copied recording sheets can be sorted promptly and also be finally processed without an operator by being connected with a finishing unit which conducts stapling, punching, and so forth.

In this document feeder with the document turning-over function, documents are piled on the stacker with their front sides upwards and the bottom document of the pile is separated from the pile and conveyed onto the platen glass sheet by sheet.

The operation of the document conveyance unit of the document feeder will be explained as follows. (1) A document is conveyed by normal rotation of the conveyance belt onto the platen glass through a conveyance path. When the trailing edge of a document is detected by a trailing edge detecting sensor, the document stops for a while. (2) The document proceeds to a document turn-over path by the reverse rotation of the conveyance belt without being exposed. (3) Then the document is conveyed onto the platen glass again and the reverse side of the document is exposed. (4) After exposure, the document is conveyed through the path of the document turning-over mechanism. (5) The document is conveyed onto the platen glass and the front side of the document is exposed. (6) After both sides of the document are exposed, this two sided document is returned onto the top of the pile of documents on the stacker.

In this circulation type document feeder which can process two sided documents, there are some problems which will be described below. After the trailing edge of the document was detected passing through in step (1) mentioned above, the document will be conveyed in the reverse direction as in step (2) mentioned above. At this moment, a small size document, such as a 'B5' document of Japanese Standard Size, is not completely compressed by a conveyance belt or a roller. Therefore, the force to convey the document to the document turn-over mechanism is not strong enough. So, some problems occur such as skewing of document, no feeding of document, jamming of document, and so forth.

SUMMARY OF THE INVENTION

The present invention was made in order to solve the problems mentioned above. Therefore, the object of the present invention is to provide a circulation type document feeder equipped with a two sided document turn-over mechanism which can prevent the document from being skewed and convey two sided documents in normal and reverse directions precisely, reliably, and stably.

The document feeder of the invention attaining the above-mentioned object will be explained as follows.

In a document feeder in which the bottom document of a pile of documents on a document stacker is conveyed sheet by sheet onto a platen glass of an exposure unit: the document is moved backward to a document turn over unit, consisting of a turn over path, without being exposed. The document is moved forward onto the platen glass after being turned over; and the document is exposed, the timing to change the conveyance means, consisting of belts and a plurality of rollers, from normal rotation to reverse rotation is determined by positively detecting that the leading edge of the document which is moving forward passes through the position where the first roller presses the platen glass, and the document is moved backward without being exposed according to the timing signal.

BRIEF DESCRIPTION OF THE DRAWINGS

Figures from FIG. 1 to FIG. 12 show examples of the present invention.

DETAILED DESCRIPTION OF THE INVENTION

An embodiment of the present invention will be explained below using the attached drawings.

Figure 1:
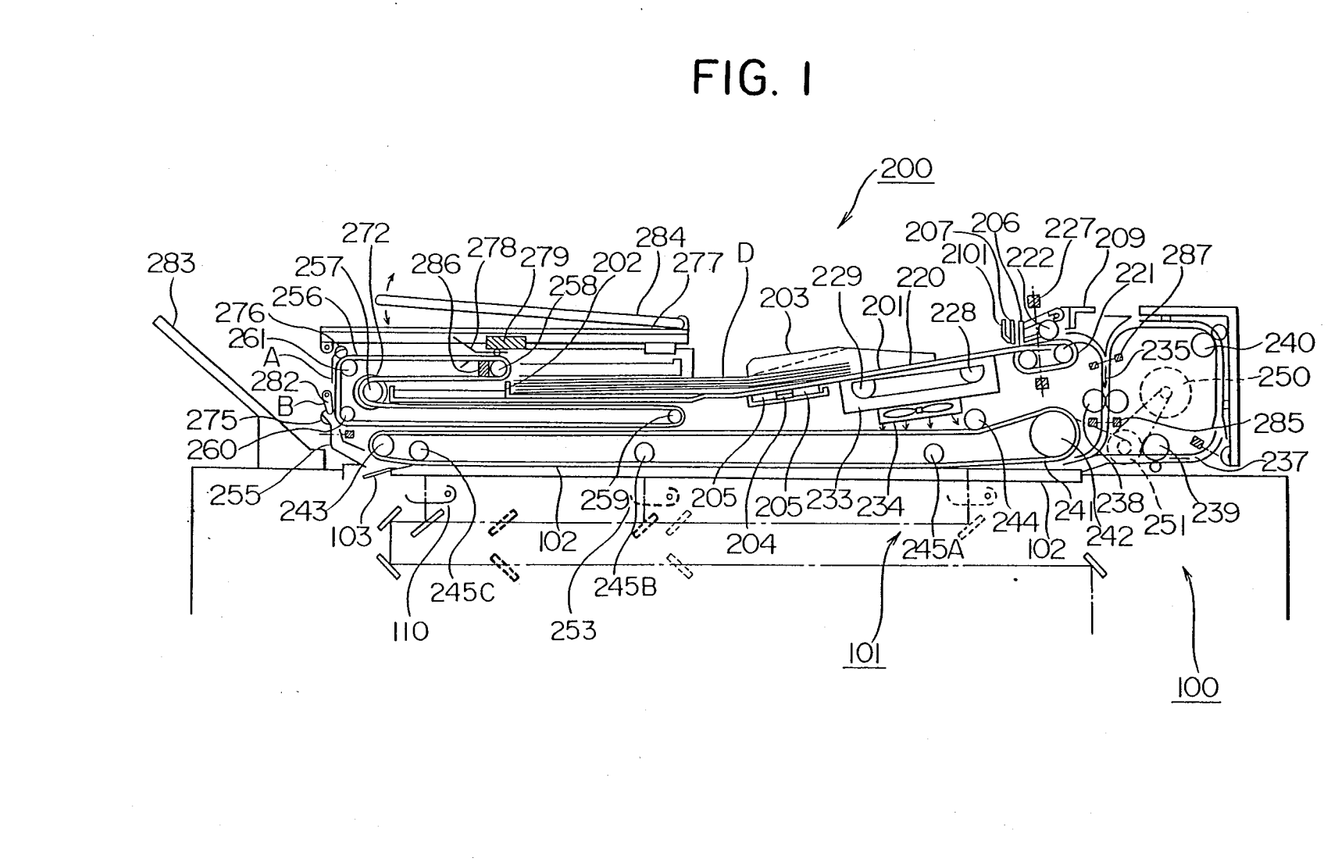
FIG. 1 is a front sectional view of the document feeder.
Figure 2:
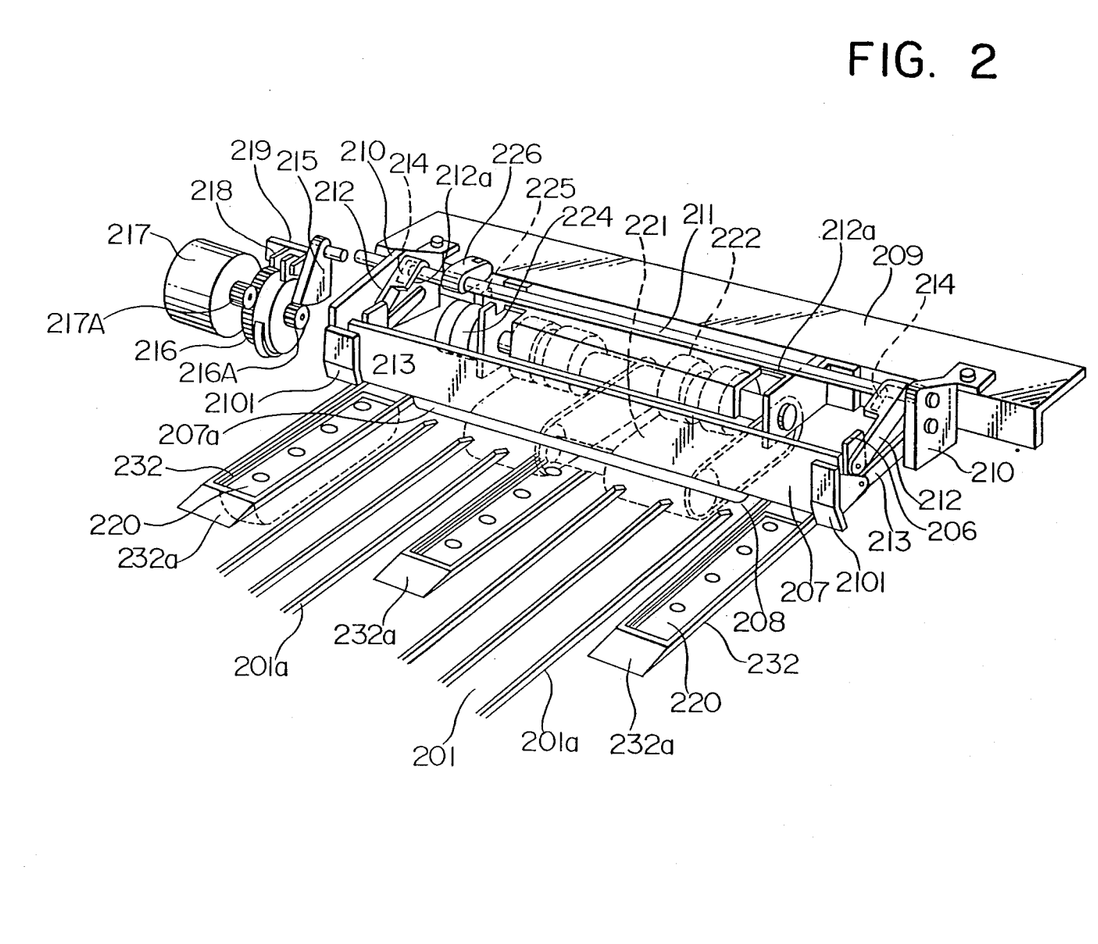
FIG. 2 is a perspective view which shows the document stacker and the document feed mechanism.
Figure 3A:
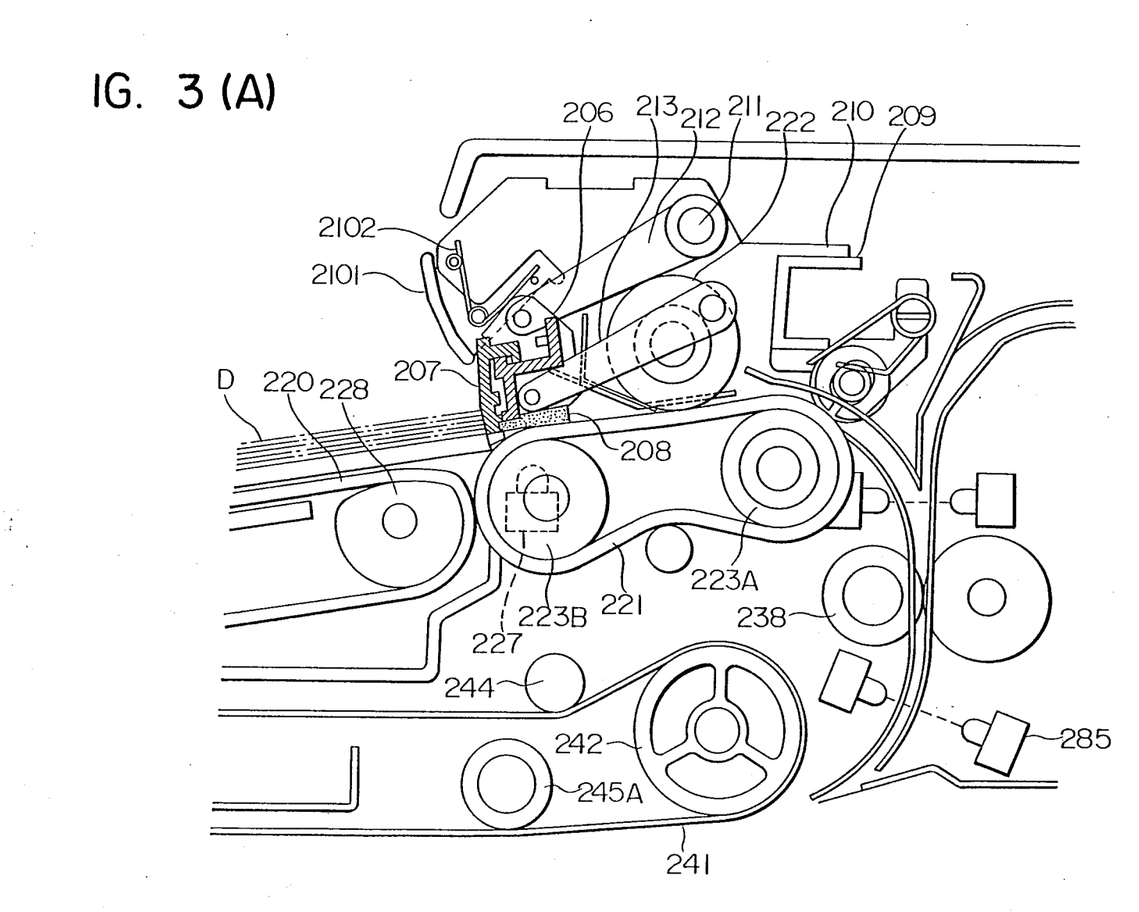
FIG. 3(A) and FIG. 3(B) are schematic illustrations which show the operation of the gate members and the document curl compressing members.
Figure 3B:
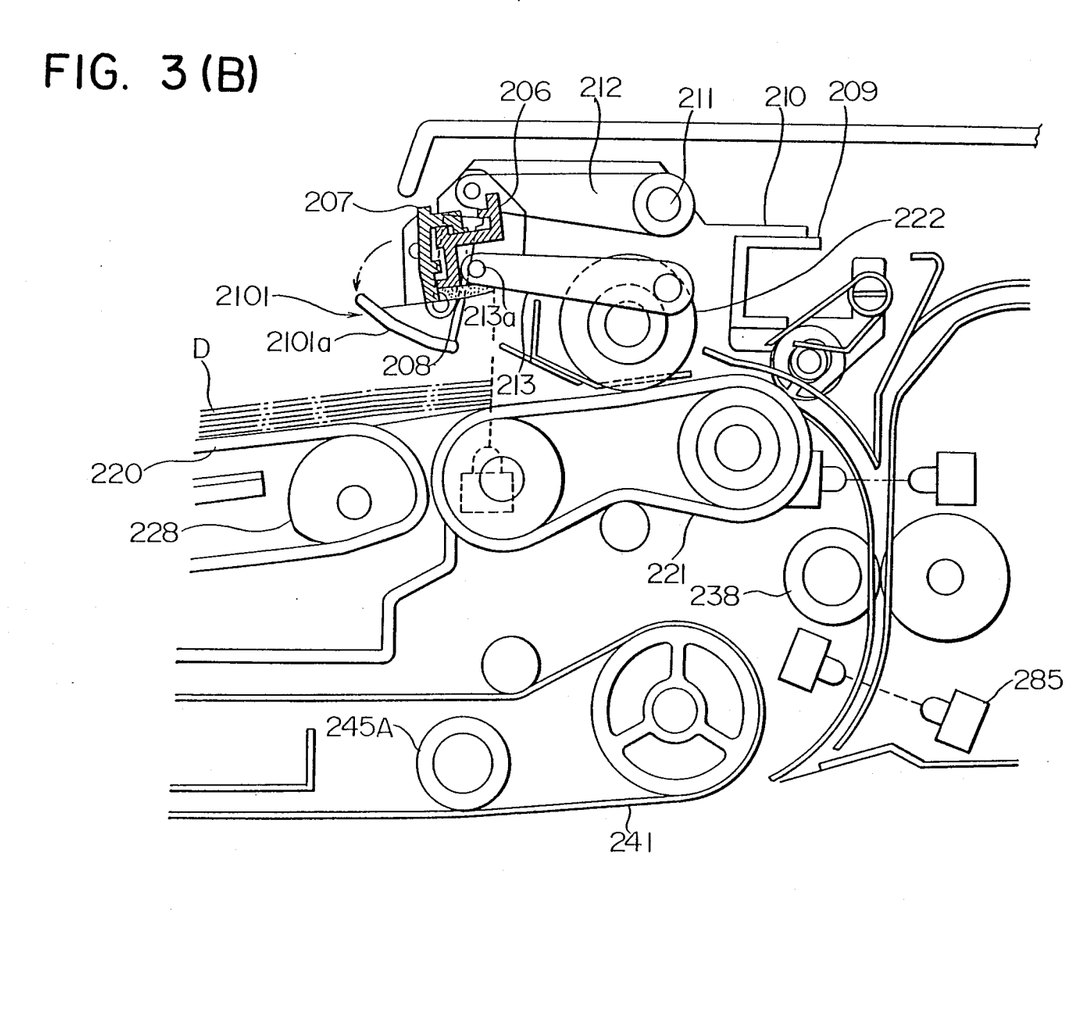
Figure 4A:
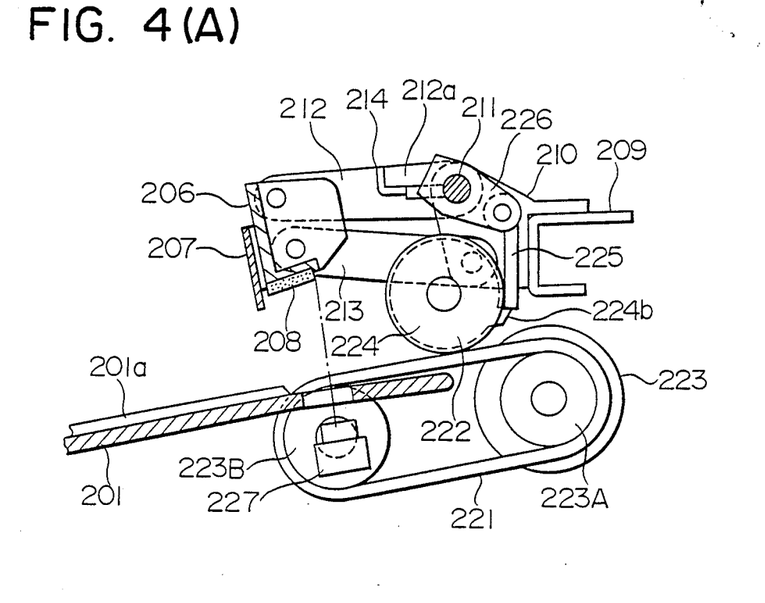
FIG. 4(A) and FIG. 4(B) are schematic illustrations which show the operation of the gate members and the document curl compressing members.
Figure 4B:
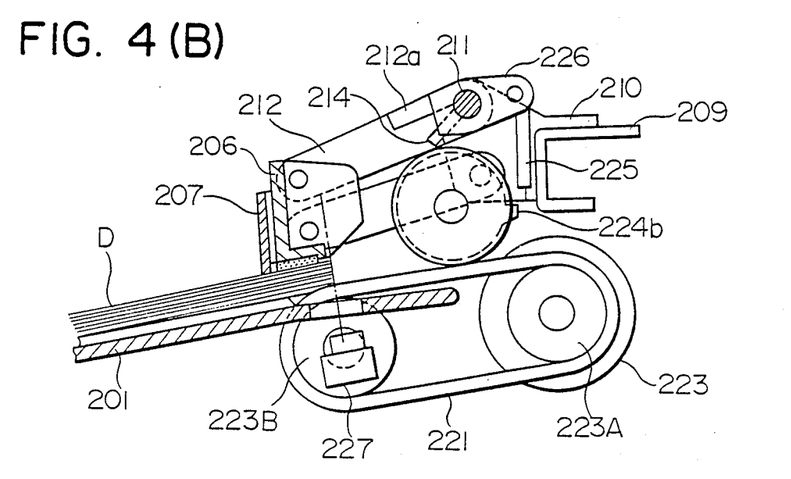
Figure 5A:
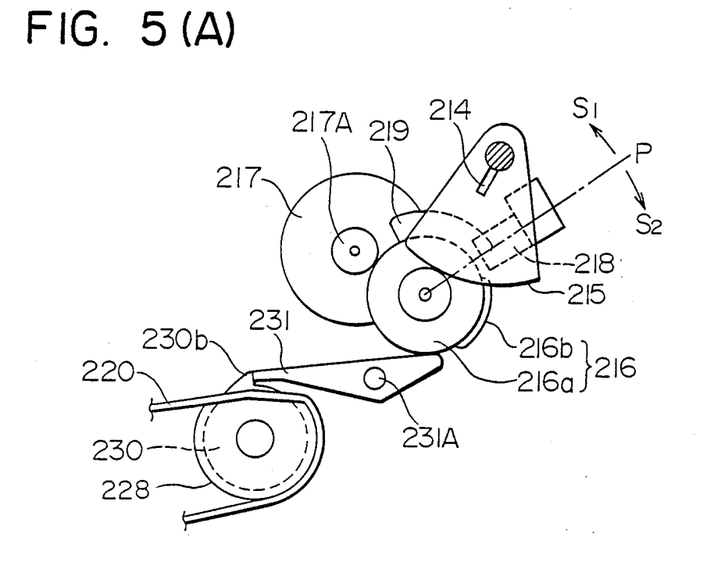
FIG. 5(A) and FIG. 5(B) are schematic illustrations which show the operation of the rotation control mechanism of the gate members.
Figure 5B:
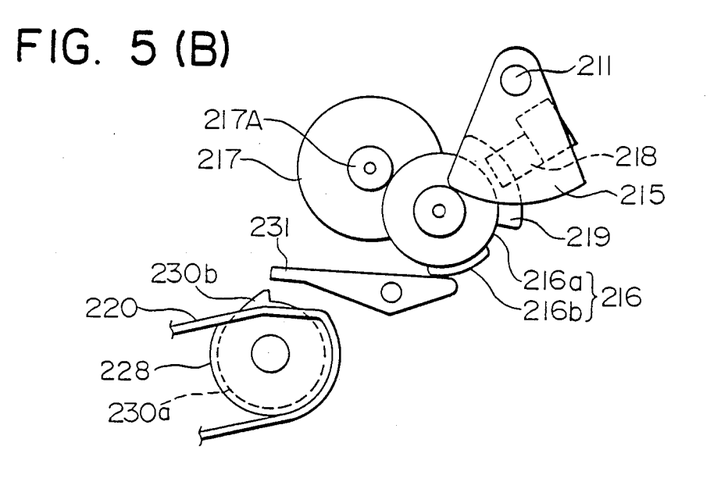
Figure 6A:
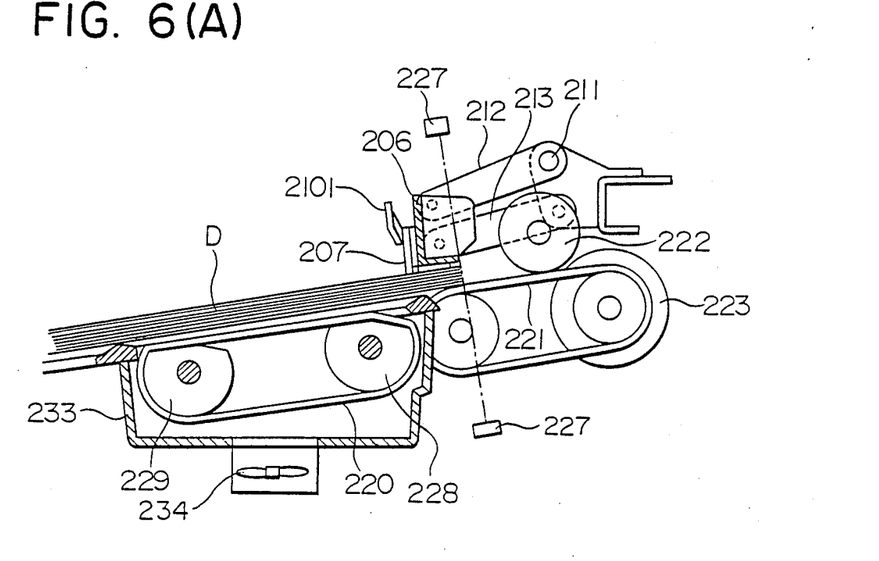
FIG. 6(A) and FIG. 6(B) are schematic illustrations which show the operation of the push belt and the non-circular rollers.
Figure 6B:
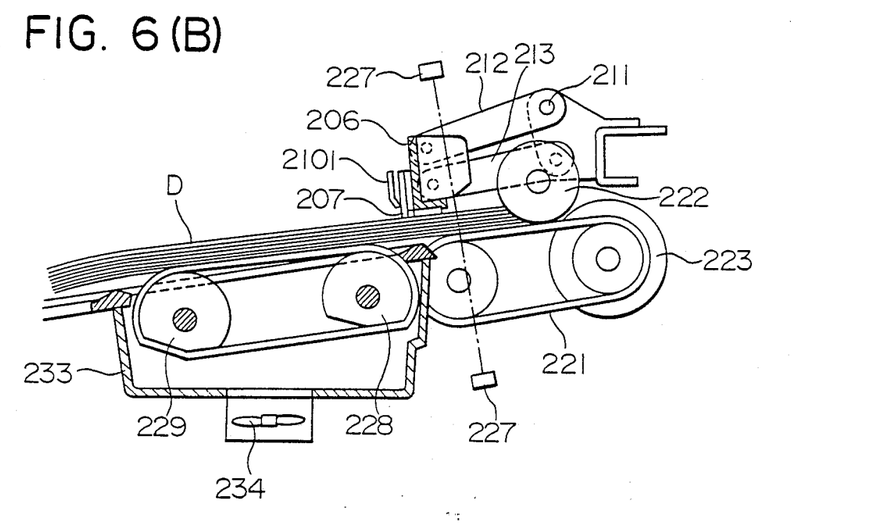

In FIG. 1, the numeral 100 represents a copy machine. and the numeral 200 represents a document feeder. The document feeder 200 is equipped with a document stacker 201 the front part of which is slanted upward. A document trailing edge arrangement board 202 against which trailing edges of document sheets are checked when document sheets 'D' are set on the document sheet stacker 201, and document sheet side arrangement boards 203 are installed in the document feeder. The document sheet side arrangement boards 203 are connected with slidable racks 205 which can symmetrically move with regard to the center line of the stacker, driven by a pinion gear 204. The position of the document sheet side arrangement boards is detected by a sensor which is not shown in the drawing and the width of the document sheet can be known with the sensor. The function of the above-mentioned document sheet trailing edge arrangement board 202 is that it pushes out the document sheets 'D' which are set on the document sheet stacker 201 until the leading edges of document sheets 'D' reach the prescribed detecting position of the stack sensor 227.

The numerals 206 and 207 are gate members which are raised when document sheets 'D' are moved toward the gate by the document sheet trailing edge arrangement board 202. The members 206 and 207 descend onto the document sheets 'D' by gravity according to a signal from the stack sensor 227 when the leading edges of the document sheets reach the detecting point of the stack sensor 227.

The inner gate member 206 compresses the document sheets 'D' to be fed with its own weight whilst the outer gate member 207 trues up the edges of the document sheets 'D' which have been processed and returned to the document sheet stacker 201 for the next sheet feeding, and divides the returned documents from the ones to be fed.

In FIG. 1, the numeral 235 is the document sheet path which guides the document sheet 'D' sent from the push belt 220 onto the platen glass 102 in the optical exposure unit 101 of the copy machine 100. The numeral 237 is the document sheet reversal path to reverse the document sheet which is fed onto the platen glass 102 after or before exposure. Another object of the reversal path 237 is to correct the order of document sheets when they are returned to the stacker after exposure. As shown in FIG. 1, the reversal path 237 begins with the platen glass, loops upward, and joins the above-mentioned path 235.

The numeral 238 is a conveyance roller (the second document sheet feed roller) which is installed on the document sheet path 235. The numeral 239 and 240 are conveyance rollers which are installed on the above-mentioned reversal path 237. These conveyance rollers 238, 239, and 240 are connected with the main motor 250 through a one way clutch and always rotate in the same direction.

The numeral 241 represents the conveyance belt which carries the document sheet 'D' onto the platen glass 102 in the normal and reverse directions. This conveyance belt 241 is stretched between the first roller 242 of the document sheet feed side and the second roller 243 of the document sheet discharge side. The first roller 242 is connected with the main motor 250 through the normal and reverse rotation changeover device 251. The tension roller 244 comes into contact with the upper surface of the conveyance belt 241 at the first roller side with pressure and a plurality of rollers 245 come into contact with the lower side of the conveyance belt 241. In this way, the conveyance belt 241 keeps slidable contact with the platen glass 102.

Figure 7:
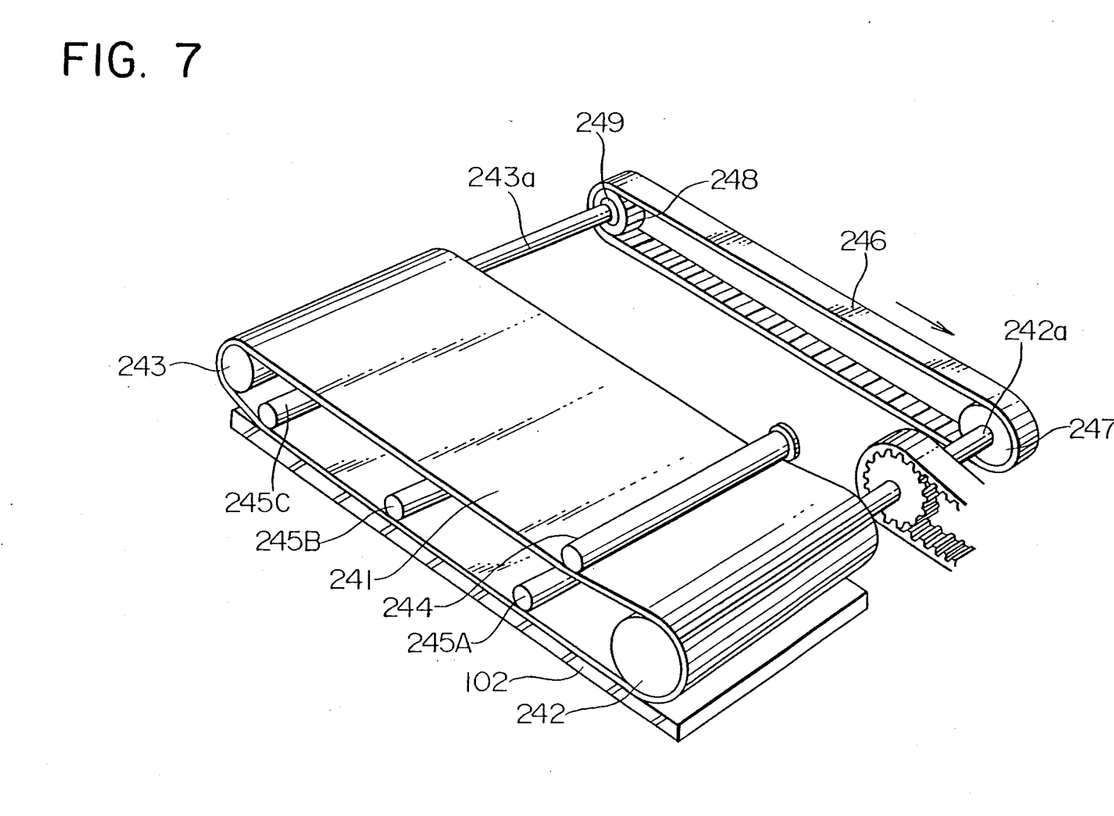
FIG. 7 is a perspective view of the conveyance belt drive unit.

As shown in FIG. 7, the first roller 242 and the second roller 243 are connected with each other by the timing belt 246. The timing pulley 247 mounted on the first roller 242 side is fixed to the first roller shaft 242a and the timing pulley 248 mounted on the second roller 243 side is fixed to the second roller shaft 243a through the one way clutch 249. The first roller 242 is arranged to have the circumferential speed which is a little faster than that of the second roller 243 which is driven through the one way clutch 249. Accordingly, when the conveyance belt 241 is rotated in the normal direction, indicated by an arrow mark in FIG. 7, the conveyance belt 241 is driven by the first roller 242 and the lower side of the conveyance belt 241 is loose. In this case, the second roller 243 is driven by the conveyance belt 241, so the one way clutch 249 slips to absorb speed difference. When the speed of the conveyance belt 241 has decreased for some reason, for example when slippage occurs between the first roller 242 and the conveyance belt 241, and sufficient torque can not be transmitted from the first roller 242 to the conveyance belt 241, the speed of the conveyance belt 241 slows down. In such a case the second roller 243 can drive the conveyance belt 241 by means of mechanical action of the one way clutch 249. In the case the conveyance belt 241 needs to be driven reversely, in other words, in the anticlockwise direction, the second roller 243 drives the conveyance belt 241. Namely, there are two cases in the operation of this device. One is that in which the conveyance belt 241 is driven by the first roller 242 and the other is that in which the belt is driven by the second roller 243. This conveyance belt driving operation is effective especially when the document 'D' is synchronously exposed while it is being conveyed on the platen glass 102.

The numeral 103 is the document sheet stopping device which is mounted on the document sheet discharge side of the platen glass 102. This stopping device 103 can move above and below the platen glass 102. The numeral 255 is the document sheet discharge guide plate which is connected with the discharge side of the platen glass 102. The numeral 256 represents the document sheet discharge belt. The document sheet discharge belt 256 is installed right behind the document sheet stacker 201. This document sheet discharge belt 256 is supported by a group of rollers. Those are the drive rollers 257 which are connected with the main motor 250 through the one way clutch 249, the upper end roller 258 and lower end roller 259 which can move horizontally along the document sheet stacker 201, and the assistant rollers 260 and 261 which are mounted at a position close to the document sheet discharge guide plate 255. The document sheet 'D' sent by the conveyance belt 241 is carried by the drive roller 257 in the document sheet discharge direction. The drive roller 257 drives the discharge belt 256, driven by the drive unit which can rotate both normally and reversely and the drive force is transmitted by chains. The moving mechanism of the document sheet belt 256 is used as the trailing edge control board 202 by which the trailing edges of document sheets are checked when document sheets are set on the document sheet stacker 201.

The operation of the document feeder in this embodiment is explained as follows.

A pile of document sheets 'D' is set on the stacker 201 with the trailing edge of the document sheets checked by the trailing edge arrangement board 202 which is at the home position. In this case, the document sheet surfaces to be copied are set facing upwards and the document sheets are arranged in order according to the pages. After both sides of the document sheets are controlled by the document sheet side arrangement boards 203, the number of copies becomes ready to be input by an operator and the copy button does to be pressed. Then the drive unit 217 to drive the gate member 206 starts its operation and lifts up the gate member 206 to allow a pile of document sheets to go through under the gate.

Then the drive unit 272 starts and moves the bottom end roller 259 backward through intermediate gears and sprockets. In accordance with this motion, the trailing edge arrangement board 202 advances forward pushing the trailing edges of the document sheets 'D', and finally the leading edges of the document sheets 'D' pass through under the outer gate member 207 and the inner gate member 206. When the leading edges of the document sheets 'D' are detected by the stack sensor 227, the drive unit 272 stops by the signal from the control means to do so, and the gate drive unit 217 turns reversely. As a result, the inner gate member 206 and the outer gate member 207 descend on the pile of document sheets.

The documents 'D' are pushed out towards the nip formed by the document feed belt 221 and the stop roller 222. The bottom document sheet of the pile of documents goes first into the nip between the document feed belt 221 and the stop roller 222. In other words, the documents 'D' go forward to the nip in order from the bottom document sheet to the top document sheet of the pile, and the leading edges of the document pile form the shape of a wedge when they are stopped by the stop roller 222.

Then the electromagnetic clutch 223 is engaged and the document sheet feed belt 221 is rotated in the document feed direction. Since the stop roller 222, which comes into contact with the document feed belt 221, remains stationary at this moment, only the bottom document sheet is sent out by the document feed belt 221 and the extra document sheets attached to the bottom document are prevented by the stop roller 222 not to be double fed. When the document feed belt 221 is rotated, the push belt 220 starts to rotate in synchronism with the movement of the document feed belt 221. While the document feed belt 221 rotates and the push belt 220 makes one revolution in synchronism with the movement of the document feed belt 221, only the bottom document sheet is sucked and separated from the pile of the documents and sent out in the document feed direction. Namely, the function of the stop roller 222 to prevent double feeding is improved further.

As explained before, the trailing edge arrangement board 202 stops its movement at the moment when the leading edges of the document sheets 'D' are detected by the stack sensor 227, and goes back to the position which is fixed according to the size of the document sheet to be copied.

In this way, a document sheet conveyed by the document sheet feed belt 221 goes into the document sheet path 235. The document sheet is nipped by the conveyance rollers 238 installed on the path and carried to the platen glass 102 and conveyance belt 241 at the synchronized exposure speed. After the leading edge of the document sheet crosses the synchronizing sensor 285 mounted on the path 235 right under the feed roller 238, the electromagnetic clutch 223 is disengaged at the right moment determined by the document sheet size.

The document sheet carried by the conveyance rollers 238 is carried onto the platen glass 102 by the conveyance belt 241. While being conveyed onto the platen glass 102 at the synchronized exposure speed, the document sheet is exposed to the light by the optical exposure system 110 which is fixed at the position 253 and an image is formed on the photoreceptor drum. After exposure, the document sheet is carried along the document sheet discharge guide plate 255 and discharged towards the document sheet stacker 201 by the document sheet discharge belt 256. In this case, with the help of the document sheet discharge board 278 and the document sheet delivery guide board 255 which is a part of the document sheet path, a group of rollers such as the compression roller 279 and the auxiliary rollers 275 and 276 hold the document sheet. So even if the document sheet delivery opening moves according to the size of the document sheet, the document sheet 'D' conveyed from the platen glass 102 by the conveyance belt 241 is nipped between the conveyance belt and the document sheet delivery opening. So, the documents are surely discharged from the device.

The leading edges and trailing edges of the document sheets 'D' which are delivered onto the document sheet stacker 201 are arranged by the outer gate member 207, the inner gate member 206, and the trailing edge arrangement board 202. Both sides of the document sheets are arranged by the side arrangement board 203. Therefore, document sheet feed efficiency is increased when those document sheets are copied next time.

The above-mentioned document sheet feed operation is repeated according to the document sheet feed timing and the synchronized conveyance speed, which are determined by the copy size and the copy magnification until all the document sheets set under the gate members 206 and 207 are conveyed out to be copied. When the stack sensor 227 detects that all the document sheets under the gate members have been conveyed and the document sheet delivery sensor 286 detects that the last document sheet is delivered, the gate members 206 and 207 are lifted up again and the document sheets on the stack are pushed by the trailing edge arrangement board 202 to the prescribed position. This operation is repeated until the required number of copies is attained. After the required number of copies is obtained and the document sheet delivery sensor 286 detects the fact, the trailing edge arrangement board 202 returns to its home position to prepare for the next operation.

The above-mentioned operation explains the case of the recycling document handler mode (RDH). It produces a one sided copy from a one sided document sheet. Therefore, the document sheet stopping device 103 which is installed at the delivery side of the platen glass 102 of the copy machine 100, is set at the level below the platen glass 102 and the optical exposure system 110 is in the mode of being fixed at the position 253. In the case that the automatic document feed mode (ADF) is set in this apparatus, the optical exposure system 110 is set to the movement mode and the document sheet stopping device 103 mounted on the delivery side of the platen glass 102 protrudes from the level of the platen glass 102. The document sheet is bumped against the stopping device 103 and stops at that position, i.e. the exposure position. The optical exposure system 110 is moved to expose the document to the light. After the required number of copies is obtained, the document sheet stopping device 103 retracts and the conveyance belt 241 starts again. Therefore the document sheet 'D' is carried to the delivery side and delivered to the document sheet discharge tray 283 from the document sheet delivery opening through the change-over claw 282 which is installed in the middle of the document sheet discharge guide plate 255.

In the case that a two sided document is to be copied one sided by RDH Mode, this mode is called RRDH Mode, the document sheet sent from the document sheet stacker 201 is carried to the platen glass 102 through the path 235. On the platen glass 102, the last page, the bottom document sheet of the pile, is set facing upward. The following operation is needed. (1) After the document sheet fed to the platen glass 102 is stopped. (2) the document conveyance belt 241 is reversed and the document sheet is sent to the reversal path 237, the document sheet is turned over and the last page is set facing downward. Then the document sheet is exposed to the light on the platen glass 102 by the optical exposure system 110 which is fixed at the position 253. (3) After being exposed to the light, the document sheet passes through the reversal path 237 again as the conveyance belt 241 is driven in the reverse direction again, so the order of the document sheets is revised and another side of the page is set on the platen glass 102 facing downward, and exposed to the light on the platen glass 102. Then the document sheet is returned to the document sheet stacker 201. A one sided copy from a two sided document is completed by repeating these (1), (2), and (3) operations explained above.

Figure 8:
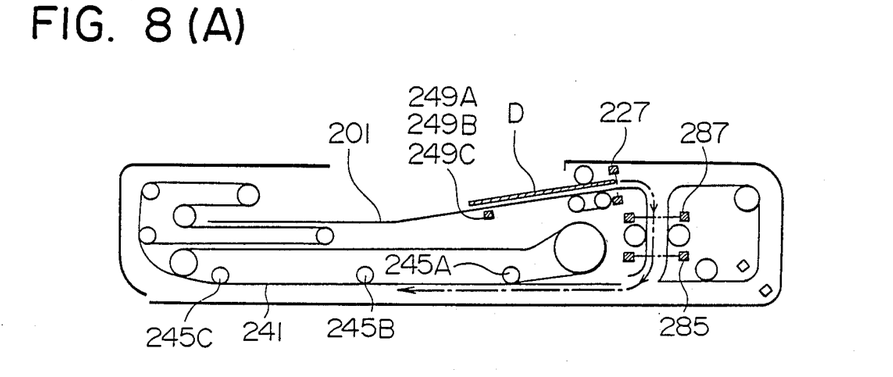
FIG. 8(A), FIG. 8(B), and FIG. 8(C) are schematic illustrations of the document conveyance path.
Figure 9:
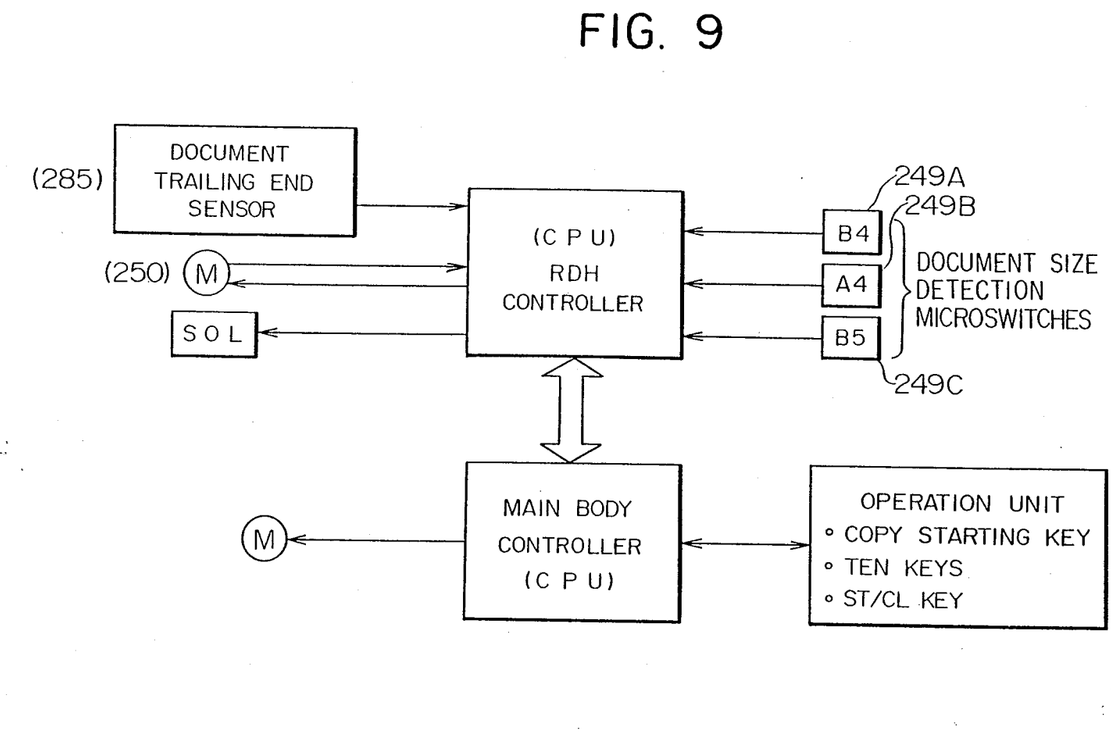
FIG. 9 is a block diagram of control system.
Figure 10:
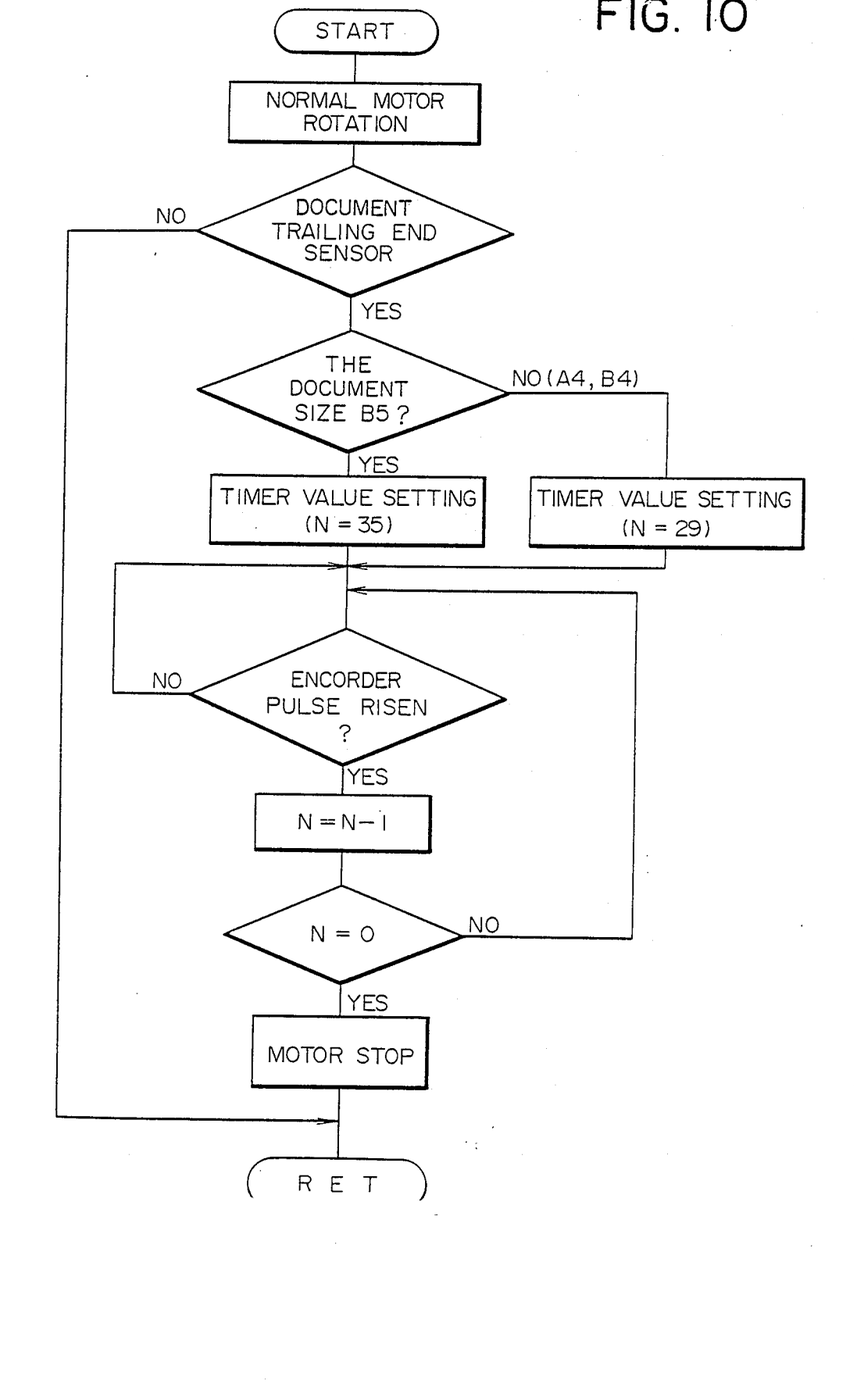
FIG. 10 is a flow chart of document conveyance.
Figure 11:
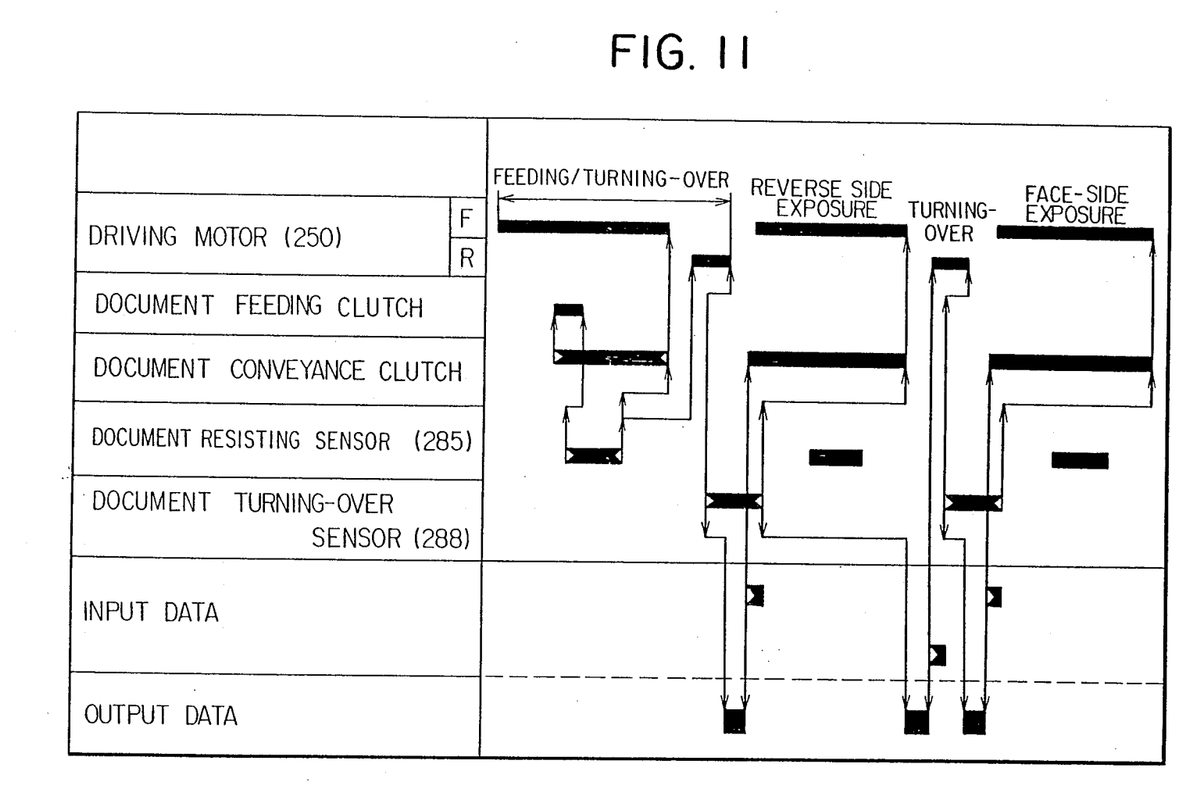
FIG. 11 is a time chart of document conveyance.

The above-mentioned document sheet feed operation in which a two sided document is to be copied one sided, called RRDH Mode, will be explained in detail using FIGS. 8, 9, 10, and 11. FIG. 8 is a schematic illustration in which the document conveyance process is explained. FIG. 9 is a block diagram in which control of the document feeder and the copy machine connected with it is explained. FIG. 10 is a flow chart in which the document conveyance process is explained. FIG. 11 is a time chart of the document conveyance process.

[1] Document feed preparing operation (1) The change-over claw 282 is set to the document discharge side B at the home position.

(2) After the documents 'D' are set on the stacker 201 and the copy button is pressed, the gate members 206 and 207 ascend and the locked stop roller 222 is released. At the same time, the document trailing edge arrangement board 202 goes forward and the change-over claw 282 is set to the document circulating discharge side path A.

(3) The stack sensor 227 detects the leading edge of the document, and the document trailing edge arrangement board 202 stops after advancing 7 mm. Then the gate members 206 and 207 descend to press the documents by their own weight. When the gate members 206 and 207 go down onto the documents, the stop roller 222 is locked.

[2] Counting the number of documents (4) When the above-mentioned preparing operation has been finished, documents 'D' are ready to be fed. The documents 'D' are fed by the push belt 220 and the document conveyance belt 221. When the leading edge of the first document 'D' is detected by the document passage detecting sensor 287, the document trailing edge arrangement board 202 goes back 24 mm to the RDH discharge position. Every time the trailing edge of the document 'D' is detected by the synchronizing sensor 285, called the document number registering sensor, the document number is counted.

(5) The timing after the first document 'D' is fed will be explained as follows. When the document passage detecting sensor 287 detects the trailing edge of the document, the next one is fed. The documents are fed in due order and their number is counted. Then the documents 'D' are conveyed by the conveyance belt 241 and the document discharge belt 256 and finally returned onto the document stacker 201. Because the gate members 206 and 207 descend on the pile of documents which are not fed yet, the returned documents can be distinguished from them.

[3] The backside document conveyance operation (6) Continuously, document feed preparing operation is conducted which is explained in Items (2) and (3) described before.

(7) A document sheet 'D' is conveyed toward the platen glass 102 through the normal path 235. After the trailing edge of the document 'D' is detected by the synchronizing sensor 285, it stops there for a while. The document trailing edge stopping position is adjustable according to the document size.

The details are explained as follows. The size of the document is detected beforehand by the microswitches 249A, 249B and 249C. When the document size is B5, which is the minimum size in this case, the timer is set to the value, N=35. In the case of other sizes, such as A4 or B4, which are bigger than B5, the timer is set to the value, N=29. When the trailing edge of the document is detected by the synchronizing sensor 285, encoder pulse is used to count the number of document sheets by deducting the number of detected document sheets from the set value N, so that N minus 1 leaves the number of the rest. When N becomes 0, the motor is stopped and document feeding operation is stopped. Refer to FIG. 8(A) and FIG. 8(B) in which the above-mentioned operation is explained. To set the timer according to the size of the document helps the minimum size document, for instance B5, the length of which is 182 mm, to be surely pressed and held by the conveyance belt 241 after its trailing edge has passed through the pressing point of the first press roller 245A.

A bigger size document such as A4, the length of which is 210 mm, or B4, the length of which is 257 mm, stops in a rather short distance after the passage of its trailing edge is detected, because the timer is set to the value, N=29. But the document 'D' is completely pressed by the press roller 245A and the conveyance belt 241.

The document size signals which are detected by the document size detecting microswitches 249A, 249B and 249C are sent to the copy machine by the three signs of SIZE A, SIZE B, and SIZE C as shown in the Table 1.

TABLE 1

| SIZE A | SIZE B | SIZE C | DOCUMENT SIZE |
|--------|--------|--------|---------------|
| L | L | H | B5 |
| L | H | L | A4 |
| H | L | L | B4 |
| H | L | H | A3 |

(8) After that, the motor is driven reversely and conveyance belt 241 moves in the reverse direction to convey the document 'D' to the document reverse unit. When the document is conveyed to the document reverse unit, even the minimum size document is completely pressed by the press roller 245A and the conveyance belt 241 and conveyed reliably. Accordingly, troubles never occur such as a skewed document feed, no feed of document, document jamming, and so forth.

The document which goes backward by the conveyance belt 241 passes through the reverse path 237 as shown by the dash line in FIG. 8(B). When a constant amount of time has passed after the trailing edge of the document is detected by the document reversal detecting sensor 288, the document is stopped for a while. In this case, the trailing edge of the document means the leading edge of the document in view of the fact that the document is going backward. Exposure timing of image forming process in the copy machine 100 is adjusted to the document at this position.

(9) In the recycling document handler mode, RDH Mode, the document starts to move according to the input signal from the copy machine 100. The document 'D' is conveyed from the document reversal path 237 onto the platen glass 102 and document exposure process is conducted. In this way, a document's backside copy is obtained.

[4] The front side document conveyance operation (10) After the backside of the document has been exposed, the document is reversed again according to the signal from the copy machine 100 and the front side of the document is exposed in RDH Mode. FIG. 8(C) shows this operation. Since this operation is the same as that of the document backside reverse operation, an explanation is omitted. After the first document 'D' is discharged, the second and subsequent documents are fed in the same way.

For duplex copying from two sided documents, the documents are returned to the document stacker 201 without exposure in the above-mentioned operation, so that only even-number pages are copied in the first circulation and odd-number pages are copied in the second circulation. When odd-numbered pages are copied, the document reverse operation is unnecessary as a matter of course. It is obvious that recording paper feed operation in the copy machine 100 is conducted in accordance with the above-mentioned document feed operation.

In the case of duplex copying from two sided documents, a small size document also is stably held and conveyed by the conveyance belt by applying the same method of detecting the document size and setting the adjustable timer.

Figure 12:
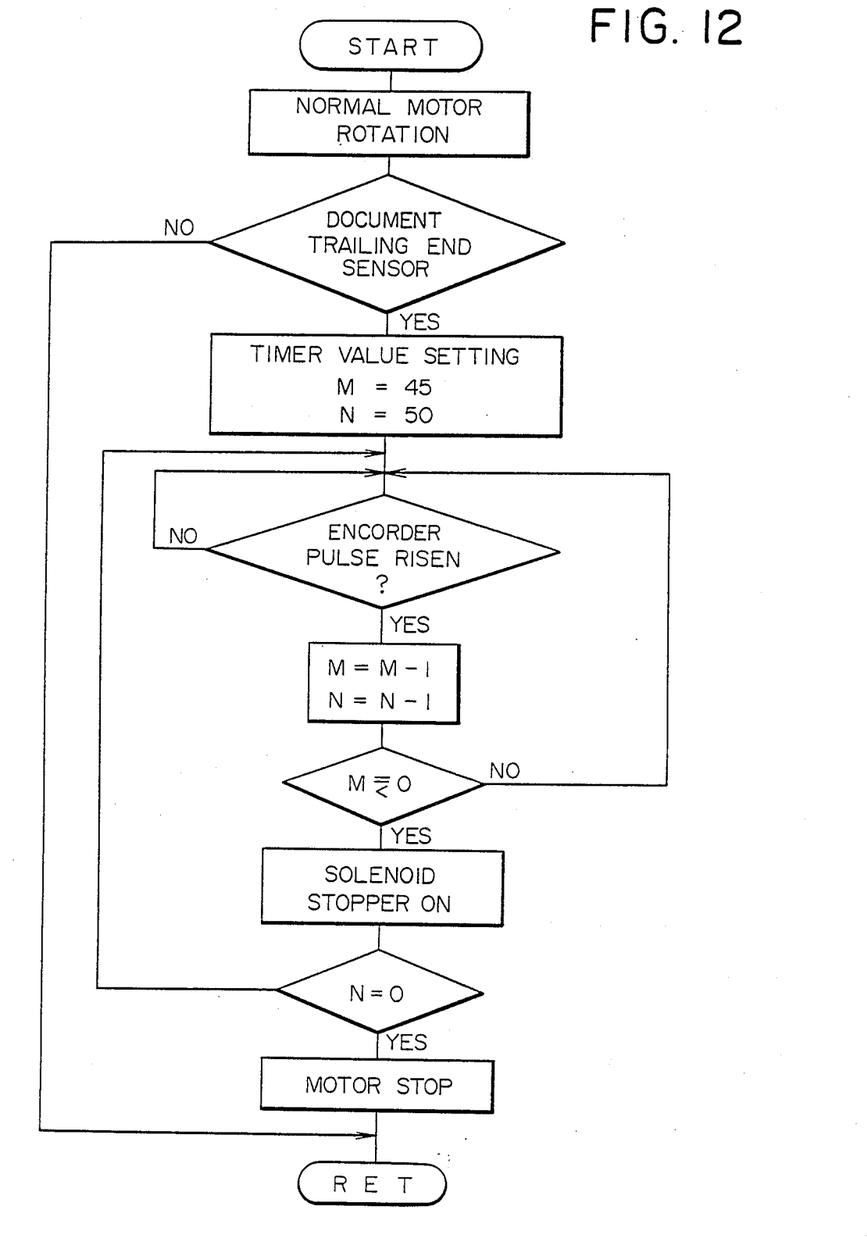
FIG. 12 is a flow chart of document conveyance of another example.

FIG. 12 is a flow chart of another example of the present invention. In this example, after the leading edge of the document is detected in the normal path 235, regardless of the document size, two kinds of values are set to the timer. They are M=45 and N=50. When M=45, the document stopping device 103 is stuck out and when N=50, the motor is stopped to stop the conveyance belt 241 operation. In this way, the leading edges of the documents 'D' come into contact with the document stopping device 103, and skewed documents, which have not been exposed yet, are corrected to the right position. After the document passes through the document reverse path 237 in the same way as mentioned before, the backside and front side of the document are exposed. This example has features in that a skewed document is precisely corrected to the right position, documents are prevented from being skewed when they are conveyed and stacked, and precise and stable copies can be obtained. But, compared with the first example explained before, the document conveyance distance from the start of copying to the end in this example is longer. Therefore, a longer time is required in this example.

As explained before, when the running direction of the document conveyance belt is changed from the normal direction to the reverse one, the movement of the conveyance belt becomes unstable and the conveyed document tends to be skewed. In order to let the document leave on the conveyance belt stably, the timing when the document leaves the conveyance belt must be set as follows. The major part of the document must be in the area between the press roller 245A and the press roller 245C, where the document is being pressed by the conveyance belt, until the conveyance belt movement becomes stable. After that, the document leaves the conveyance belt to be conveyed stably.

The advantages of the present invention will be explained below. When a document is conveyed from the document stacker to the platen glass and the document is reversed without being exposed to the light, the document is held and conveyed with a prescribed pressure regardless of the document size. Especially in the case of a small document size, problems such as skewing of a document, no feeding of document, jamming of document, and so forth are solved, so a copy image can be obtained at the precise position.

Furthermore, it is a more secure way in order to prevent documents from skewing that all sizes of documents are reversed after they are conveyed to contact with the document stopping device, which is installed at the end of the platen glass.

What is claimed is:

1. In a photocopier, a document conveyance apparatus for conveying each of a plurality of original documents in sheet form to a document turn-over means and to a copying position on a platen, comprising:

first conveyance means for conveying an original through a guide path toward said copying position;

second conveyance means for receiving from said guide path an original moving in a given direction, moving such original along said given direction by a selected distance, and then conveying such original to a document turn-over means, said second conveyance means including a belt and means arranged to form a flat area of said belt at a predetermined position of the photocopier;

means for detecting size of an original; and control means for adjusting the selected distance the second conveyance means moves such original so that a substantial surface area of such original is engaged by the flat area of said belt, wherein said control means adjusts said selected distance in response to the detected size of an original.

2. The apparatus of claim 1, wherein an original at said predetermined position is pressed between said platen and said flat area of the belt.

3. The apparatus of claim 2, wherein said control means adjusts the selected distance so that at least a substantial part of the surface area of an original is engaged by the flat area of said belt regardless of the size of such original.

4. The apparatus of claim 2, wherein said control means adjusts the selected distance so that the entire surface area of an original, if it is of a relatively small size, is engaged by the flat area of said belt.

5. The apparatus of claim 3, wherein said means arranged to form a flat area of the belt comprises a plurality of pressure rollers perpendicular to said given direction and pressing against said belt to form said flat area.

6. The apparatus of claim 5, wherein said control means adjusts the selected distance in relation to the flat area being defined as starting at the leading one of said plurality of pressure rollers relative to motion of an original in said given direction.

7. The apparatus of claim 6, wherein the second conveyance means conveys an original from the predetermined position to said document turn-over means in a direction opposite to said given direction.

8. The apparatus of claim 7, wherein said control means selectively inhibits occurrence of photocopying until after an original has passed once through said document turn-over means.

9. The apparatus of claim 8, wherein said conveyance means is controlled by said control means to hold an original at said predetermined position prior to conveying such original to said document turn-over means.

10. The apparatus of claim 9, further comprising means for sensing passage of a trailing edge of an original at a detection point, and wherein adjustment by said control means of the selected distance is done responsive to said sensing means and by measuring said selected distance from said detection point.

11. The apparatus of claim 10, wherein said sensing means is in said guide path and near the leading edge of said flat area of the belt.

12. The apparatus of claim 11, further comprising means for holding a stack of originals, and wherein said first conveyance means conveys an original at the bottom of said stack through said guide path.

13. The apparatus of claim 1, wherein said control means adjusts the selected distance so that at least a substantial part of the surface area of an original is engaged by the flat area of said belt regardless of the size of such original.

14. The apparatus of claim 1, wherein said control means selectively inhibits occurrence of photocopying until after an original has passed once through said document turn-over means.

15. The apparatus of claim 1, wherein said conveyance means is controlled by said control means to hold an original at said predetermined position prior to conveying such original to said document turn-over means.

16. The apparatus of claim 1, further comprising means for sensing passage of a trailing edge of an original at a detection point, and wherein adjustment by said control means of the selected distance is done responsive to said sensing means and by measuring said selected distance from said detection point.

17. The apparatus of claim 16, wherein said sensing means is in said guide path and near the leading edge of said flat area of the belt.

18. The apparatus of claim 1, further comprising means for holding a stack of originals, and wherein said first conveyance means conveys an original at the bottom of said stack through said guide path.

* * * * *